Aug. 30, 1949.   F. W. MERRILL   2,480,590
MOTOR SPEED REGULATING CIRCUIT
Filed Jan. 3, 1947
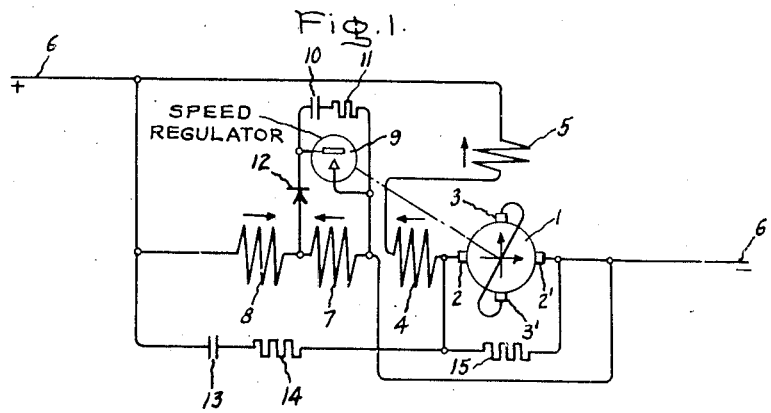
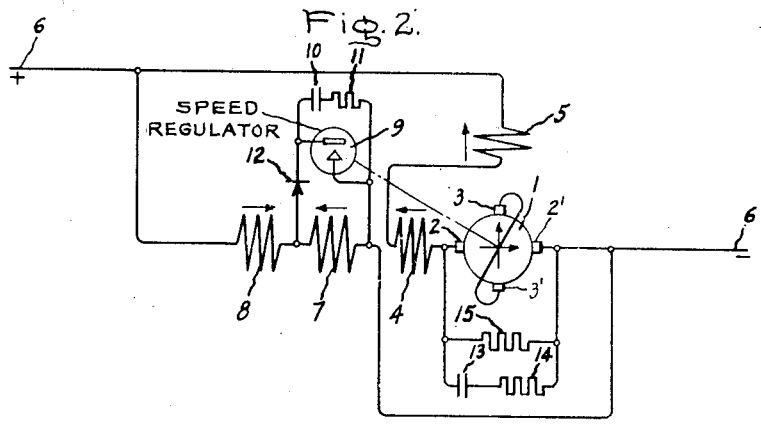
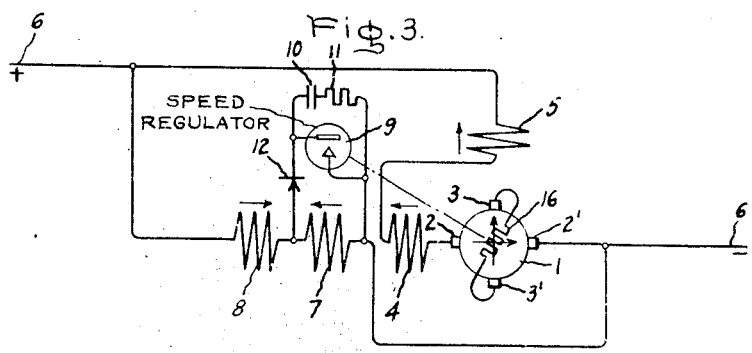
Inventor:
Frank W. Merrill,
by *Prowell S. Mack*
His Attorney.

Patented Aug. 30, 1949

2,480,590

UNITED STATES PATENT OFFICE 2,480,590

MOTOR SPEED REGULATING CIRCUIT

Frank W. Merrill, Fort Wayne, Ind., assignor to General Electric Company, a corporation of New York Application January 3, 1947, Serial No. 720,057

12 Claims. (Cl. 318—325)

My invention relates to motor speed regulators and more particularly to improvements in a speed regulating circuit for direct current motors.

In my Patent No. 2,270,708, issued January 20, 1942, I have described and claimed means for very closely regulating the speed of a direct current dynamoelectric machine, particularly adapted to the cross-armature reaction excited, direct-axis compensated, type of machine. In this patent the control field current is regulated in a well known manner by the use of a vibratory contact, centrifugally-operated speed governor. In my pending application Serial No. 573,552, filed January 19, 1945, now Patent No. 2,456,979, I have shown a particular type of centrifugally-operated speed governor which has proven to give superior quality of regulation and with a minimum of contact arcing and transient current conditions in the motor field circuit. My present invention relates to an improved form of speed regulating circuit of the same general type as shown in Patent No. 2,270,708 and is designed for use with a centrifugally-operated contact speed regulator of the type shown in my above mentioned pending application S. N. 573,552; however, the improved circuit is sufficiently effective to operate satisfactorily with a standard speed regulator which does not have the anti-hunt features of the particular device covered in this pending application.

In accordance with my invention, I provide a cross-armature reaction excited, direct-axis compensated, dynamoelectric machine having a plurality of control field windings, the current in one of the control field windings being varied at a high frequency rate by means of a centrifugal speed governor placed in shunt relationship with the field winding. In practice, it has been found that as long as the contact configuration of the speed governor as shown in application Serial No. 573,552 remains substantially correct, voltage and current transients in the motor field windings will be eliminated. However, when, due to wear, the contact surfaces become flat, eliminating the forced contact bounce, such transients will again appear with a resultant erratic operation of the speed control system. I have found that another means of controlling the transient conditions in the motor field circuit is by the use of a suitably designed and properly placed electrical energy absorbing circuit or filter, which forms the subject matter of this invention. In referring to the transient conditions occurring in the direct axis armature circuit, the term "false current" will be used for convenient reference, and may be defined as any excess of motor rotor current obtained by using the vibratory type of regulator over that rotor current obtained by straight adjustable field resistance control of the same motor under the same operating conditions. Thus, if an adjustable field resistance were used in place of the vibratory speed regulator, and the values of input current to the rotor established under stable conditions for definite values of line voltage, load and speed, these current values should be considered as normal. It will sometimes be found, when the vibratory type of regulator is substituted for the field resistance, that the effective rotor current is considerably greater, this current difference being termed "false current." False current is objectionable because its presence indicates unstable operating conditions and also because there is a resulting loss in motor power due to increased heating, and a reduction in brush life and increased commutator maintenance. By the use of suitable electrical filter circuits, which will be subsequently described, I have found that false current may be eliminated, even after a period of operation which would ordinarily lead to erratic regulation due to wear of the contacts of the centrifugal speed governor of my pending application Serial No. 573,552. In other words, the filters are sufficiently effective to suppress false current even if the centrifugal regulator be initially fitted with perfectly flat contacts having no forced rotational bounce whatever.

It is, therefore, an object of my invention to provide an improved motor speed regulating system.

Another object of my invention is to provide an improved and accurate automatic speed regulating system including an electrical filter circuit for direct current motors.

A further object of my invention is to provide an improved motor speed control circuit for use with a centrifugal speed governor which will have extremely long life marked by the absence of maintenance and contact adjustment.

My invention will be better understood from the following description taken in connection with the accompanying drawing, and its scope will be pointed out in the appended claims. In the drawing, Fig. 1 is a diagrammatic illustration of a preferred embodiment of my invention showing the filter circuit placed in parallel with the starting and compensating windings of the direct current motor; Fig. 2 illustrates a modified form in which the filter is placed in parallel with the armature of the motor, and Fig. 3 illustrates another modification in which a resistance element is placed in the quadrature armature circuit of the motor.

Throughout the various figures of the drawing, the same reference numerals have been applied to corresponding circuit elements.

Referring now to the drawing and particularly to Fig. 1, I have shown a motor, the speed of which must be accurately controlled, having an armature 1 and provided with a commutator. The armature construction is similar to that found in any conventional direct current machine and as shown is arranged for cooperation with a pair of direct axis brushes 2 and 2', and a pair of auxiliary brushes 3 and 3' displaced from the main brushes, the angle of displacement being 90 electrical degrees. The motor is provided with a plurality of field windings including a compensating field winding 4 and a starting series field winding 5. Thus, it will be seen that the motor armature 1, the main brushes 2 and 2', the compensating field winding 4 and the starting series field winding 5 are all in series circuit relationship with the source of direct current energy indicated at the terminals 6. A pair of control field windings 7 and 8 are also disposed on the motor frame to send flux through the armature along the axis of the main brushes 2 and 2' and are connected to produce flux of opposite polarity as shown by the arrows placed alongside the windings 7 and 8 in Fig. 1. The windings 7 and 8 are in shunt relationship with the motor armature and the series field windings and are, therefore, energized directly from the supply wires 6 and with a relatively constant potential. For adjusting the current flow in the field winding 7, a vibratory contact centrifugally-operated speed governor 9, of the type shown in my pending application Serial No. 573,552, is mounted on the motor shaft, having its contacts connected in parallel with the field winding 7 and having a customary arc-suppressing circuit consisting of a capacitance 10 and resistance 11 in series, also connected in parallel with the speed regulator contacts. In order to prevent regeneration between the capitance 10 and the inductance of the field winding 7, a unidirectional current conducting device, such as a copper oxide or selenium rectifier unit 12, is placed in one lead to the speed regulator so that current can flow only in the proper direction through the regulator and the arc-suppressing filter circuit.

In accordance with my invention, a filter circuit consisting of a capacitance 13 and resistance 14 is placed in parallel with the compensating field winding 4 and starting series field winding 5 for the purpose of preventing fluctuation in the main line current of the motor.

The prevention of current fluctuation is accomplished by the capacitor 13 which operates in conjunction with the resistance of the windings 4 and 5, carrying the main load current. Any tendency of the main current to fluctuate produces a varying resistance drop in the windings, which causes corrective current to flow in the capacitor. The capacitor being of large size is extremely effective, substantially preventing any fluctuation of input current.

A filter could, therefore, be made by using the capacitor alone, if it were not for one undesirable effect: When the main line switch (not shown) is opened, and the motor is in the process of slowing down, regeneration would occur between the field windings 4 and 5 and the capacitor 13. This could be prevented by a special line switch arranged to open the capacitor circuit as the main switch is pulled, but a better way is the insertion of a low ohmic value resistance unit 14 in series with the capacitor. It has been found possible to select a resistor which will prevent, or damp out, the regeneration but will not interfere with the operation of the capacitor as a suppressor of current fluctuations.

The actual causes of the current fluctuation producing "false current" flow to the rotor are as follows: (1) The wide flux-range of this type of motor (about 6 to 1) gives the regulator great control power when the motor is operating in the mid-speed range under high line voltage conditions. For example, one type of motor having "false current" operated over a speed range of 2350 to 6800 R. P. M., 22 to 30 volts, no load to full load, −55° C. to 74° C. without any circuit change whatever—entirely by adjustment of the speed regulator. The difficult part of the range is under the 30 volt condition and between 4000 and 5500 R. P. M. False current is usually confined to the production of very bad surges of input current, but does not often cause speed oscillations of the motor. This great control margin, enabling the regulator to either rapidly decelerate or accelerate the motor, gives it the potential ability to produce large oscillations of input current, unless the motor circuits are either inherently stable or effectively damped. (2) The motor circuits are not inherently stable, because the time-constant of the quadrature field circuit is much greater (slower) than the response-time of the control circuit. Thus, the field response lags the regulator corrective impulses, which causes over-correction and hunting. The quadrature field-time constant cannot be reduced without a considerable addition of external resistance to the quadrature brush circuit. Such an arrangement is shown in Fig. 3. It prevents the establishment of false current, by elimination of its cause, but it is not the most desirable solution, particularly for an aircraft applied motor where weight is a major consideration. If this method of stabilization were chosen, the full field speed under the 30-volt no-load condition (which must be around 2000 R. P. M. to provide regulating margin) would be greatly increased, and a larger and heavier motor would have to be built to overcome this condition.

With the arrangement shown in Fig. 1 it has been found possible to reduce false current to a negligible value so that the motor appears to be operating as if it were under straight variable field resistance control. A power controlling resistor 15 is usually provided in parallel with the main brushes 2 and 2' for purposes of obtaining maximum compensation (in a shunt manner) under the conditions where it is desirable to get maximum torque and speed with the minimum applied voltage. The use of the resistance 15 is fully explained and described in my previous Patent No. 2,270,708. From the foregoing it will be seen that the filter circuit, consisting of the capacitance 13 and resistance 14, operates as a stabilizing or anti-hunting means, and prevents variation in the main line current through the brushes 2 and 2' by absorbing excess energy when the armature current rises, and returning energy to the armature circuit during periods of low current in the field windings 4 and 5, thereby maintaining the current flow through the brushes 2 and 2' substantially constant.

In Fig. 2 I have shown a modification of the filter controlled speed regulator of Fig. 1, and it will be noted that in Fig. 2 the filter, consisting of a capacitor 13 and resistor 14, has now been placed in parallel with the power controlling resistance 15 and also in parallel with the main brushes 2 and 2' on the motor armature. In a motor of this type, the resistance of the armature plus brush contact resistance is usually only slightly more than the combined resistance of the series compensating field winding and starting field winding 5. Thus the filter as shown in Fig. 2 is subjected to approximately the same or slightly greater voltage oscillations than if placed as shown in Fig. 1 and the operation is the same since the filter acts to smooth out the main line current passing through the motor armature, as described previously in connection with Fig. 1. However, there is one objection to locating the filter circuit across the main armature brushes 2 and 2', namely, that these brushes are at the origin of the motor counter electromotive force, which causes nearly all of the line voltage to appear at this point greatly increasing the D.-C. voltage applied to the capacitor 13. Thus the location of the filter as shown in Fig. 1 has the advantage that a lower voltage capacitor 13 may be used, providing a smaller and lighter weight filter unit, which is of considerable importance in aircraft applications. Figure 1 is, therefore, a preferred arrangement, but Figure 2 is also a workable circuit and just as effective in preventing false current.

Figure 3 has previously been explained briefly; it prevents false current by removal of the cause, that is, the slow time constant of the quadrature axis circuit, rather than by filtering the infinitesimal oscillations of voltage drop as they tend to occur. While this modification is subject to the disadvantage of requiring a larger size motor for the same output since the use of the resistance reduces the quadrature field flux, it is, however, useful where size is not particularly critical, and a high quality of speed regulation and simplicity are desired.

While I have shown and described my invention as applied to a particular system and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. Speed control means for a dynamoelectric machine comprising, a direct current motor, a main shunt control field winding for said motor, a series field circuit for said motor, said series field circuit including a compensating field and a starting field, motor speed responsive means for regulating the current flow in said control field circuit to maintain said motor speed substantially constant, and electrical energy absorbing means connected in parallel with said starting field winding and said compensating field winding.

2. Speed control means for a dynamoelectric machine comprising, a direct current motor, a control shunt field circuit for said motor, said control field circuit including a main field winding and a differential field winding connected in series, a series field circuit for said motor, said starting field circuit including a compensating field winding and a starting field winding, a vibratory contact speed regulator for said motor, and an electrical filter for said motor connected in parallel with said starting field winding and said compensating field winding, said filter including capacitance and resistance elements in series circuit relationship.

3. Speed control means for a dynamoelectric machine comprising, a direct current motor, a shunt field circuit for said motor, said shunt field circuit including a pair of control field windings of opposed flux polarity connected in series, a series field circuit for said motor, said series field circuit including a compensating field winding and a starting field winding, a vibratory contact centrifugally operated speed regulator for said motor connected in parallel with one of said control field windings, and an oscillation suppressing filter for said motor connected in parallel with said series field winding circuit, said filter including a capacitor and a resistor in series.

4. In combination, a direct current electric motor having a control shunt field circuit, said control shunt field circuit including a control field winding and a differential field winding in series circuit relationship, an armature for said motor, a set of direct axis brushes for said motor, a set of auxiliary brushes displaced in quadrature relationship from said direct axis brushes, said auxiliary brush axis circuit having a relatively slow time constant, a direct axis armature circuit for said motor including a starting field winding and a compensating field winding connected in series with said direct axis brushes, said direct axis armature circuit having a relatively fast time constant, means responsive to motor speed for controlling current flow in said differential field winding for maintaining said motor speed substantially constant, and filtering means including a capacitor connected across a portion of said direct axis armature circuit for suppressing oscillations between said fast time constant direct axis brush circuit and said slow time constant auxiliary brush quadrature axis circuit.

5. In combination, an electric motor having a control shunt field circuit, said control shunt field circuit including a control field winding and a differential field winding in series relationship, an armature for said motor, a set of direct axis brushes for said motor, a set of auxiliary brushes displaced in quadrature relationship from said direct axis brushes, oscillation suppressing means including a resistance element for short circuiting said auxiliary brushes, and means responsive to the speed of said motor for controlling current flow in said differential field winding to maintain constant said motor speed.

6. In combination, an electric motor having a control shunt field circuit, said control shunt field circuit including a control field winding and a differential field winding in series relationship, an armature for said motor, a set of direct axis brushes for said motor, a set of auxiliary brushes displaced in quadrature relationship from said direct axis brushes, oscillation suppressing means including a resistance element for short circuiting said auxiliary brushes, and a centrifugally operated vibratory contact speed regulator mechanically connected to said motor armature for varying the excitation of said differential field winding to maintain said motor speed substantially constant.

7. In combination, a direct current electric motor having a control shunt field circuit, said control shunt field circuit including a pair of control field windings in series circuit relationship, a pair of direct axis brushes for said motor, a starting field winding and a compensating field winding in series with said direct axis brushes, a pair of auxiliary brushes displaced in quadrature relationship from said direct axis brushes, a centrifugal vibratory contact speed responsive governor mechanically connected to said armature for controlling current flow in one of said control field windings, and means including a resistance element connected in series with said auxiliary brushes for decreasing the time constant of said auxiliary brush quadrature axis circuit.

8. Speed control apparatus for a dynamoelectric machine comprising, in combination, a direct current motor having an armature, a control shunt field circuit for said motor, said shunt field circuit including a main field winding and a differential field winding, a series field circuit for said motor having a pair of field windings in series circuit relationship with each other and with said armature, a filter circuit connected in parallel with the armature of said motor, said filter circuit comprising a resistance and a capacitance in series circuit relationship, and motor speed responsive means for varying the net flux in said shunt field circuit to maintain said motor speed substantially constant.

9. Speed control apparatus for a dynamoelectric machine comprising, in combination, a direct current motor having an armature, a control shunt field circuit for said motor, said shunt field circuit including a main field winding and a differential field winding, a series field circuit for said motor having a pair of field windings in series circuit relationship with each other and with said armature, a filter circuit connected in parallel with the armature of said motor, said filter circuit comprising resistance and capacitance elements in series circuit relationship, and a vibratory contact speed responsive regulator connected to said armature for varying the excitation of said differential field winding to maintain said motor speed substantially constant.

10. Speed control apparatus for a dynamoelectric machine comprising, in combination, a direct current motor having an armature, a control shunt field circuit for said motor, a series field circuit for said motor having a pair of field windings in series circuit relationship with each other and with said armature, a filter circuit connected in parallel with the armature of said motor, said filter circuit comprising a resistor and a capacitor in series circuit relationship, and motor speed responsive means for varying the effective flux produced in said control field winding to maintain said motor speed substantially constant.

11. Speed control apparatus for a dynamoelectric machine comprising, in combination, a direct current motor having an armature, a control shunt field circuit for said motor, a series field circuit for said motor having a pair of field windings in series circuit relationship with each other and with said armature, electrical energy absorbing means connected in parallel with the armature of said motor, said energy absorbing means comprising a resistance and a capacitance in series circuit relationship, and a motor speed responsive centrifugal governor having a pair of vibratory contacts for varying the current flow in said control shunt field circuit to maintain said motor speed constant.

12. In combination, a direct current motor having a pair of direct axis brushes and a pair of quadrature axis brushes, an armature circuit for said motor including said direct axis brushes and a series field exciting winding, a pair of differentially related control field windings connected across at least a portion of said armature circuit, a vibratory contact speed regulator responsive to the speed of said motor for controlling the current through one of said control field windings, and energy storing means connected across at least a portion of said armature circuit to suppress false currents in said circuit.

FRANK W. MERRILL.

REFERENCES CITED

The following references are of record in the file of this patent:

UNITED STATES PATENTS

| Number | Name | Date |
|---|---|---|
| 792,102 | Winter et al. | June 13, 1905 |
| 1,732,367 | Kleinschmidt | Oct. 22, 1929 |
| 2,113,234 | Lee | Apr. 5, 1938 |
| 2,270,708 | Merrill | Jan. 20, 1942 |